(12) United States Patent  
Musashi et al.

(10) Patent No.: US 7,501,192 B2  
(45) Date of Patent: Mar. 10, 2009

(54) RECORDING MEDIUM INCLUDING PROTECTION LAYER HAVING UNEQUAL PROPERTY

(75) Inventors: Takayuki Musashi, Kawasaki (JP); Yoshiharu Kasamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 10/919,468

(22) Filed: Aug. 17, 2004

(65) Prior Publication Data

US 2005/0233175 A1   Oct. 20, 2005

(30) Foreign Application Priority Data

Apr. 14, 2004   (JP)   .............. 2004-118931

(51) Int. Cl.  
*G11B 5/66* (2006.01)

(52) U.S. Cl. .................... 428/833; 428/835.4

(58) Field of Classification Search .............. 428/833.2, 428/833.3, 833.4, 833.5  
See application file for complete search history.

(56) References Cited

U.S. PATENT DOCUMENTS 6,403,194 B1 * 6/2002 Ono et al. ............... 428/841.2

FOREIGN PATENT DOCUMENTS

| JP | 5-282663 | 10/1993 |
| JP | 2000-268355 | 9/2000 |
| JP | 2001-202617 | 7/2001 |

OTHER PUBLICATIONS

Machine translation of JP 2001-202617, Jan. 2000.*

* cited by examiner

*Primary Examiner*—Holly Rickman  
(74) *Attorney, Agent, or Firm*—Kratz, Quintos & Hanson, LLP.

(57) ABSTRACT

A first protection layer is overlaid on the surface of a recording layer in a recording medium. A second protection layer is overlaid on the surface of the recording layer at a position adjacent the first protection layer. The second protection layer has a composition different from that of the first protection layer. The first and second protection layers have different compositions, so that the overall protection layer is allowed to have an unequal property. The second protection layer may have a hardness higher than that of the first protection layer. A higher hardness of the second protection layer serves to avoid damages on the surface of the recording medium rather than the first protection layer. The recording medium can reliably be protected from collision or contact of an object.

9 Claims, 5 Drawing Sheets

RECORDING MEDIUM INCLUDING PROTECTION LAYER HAVING UNEQUAL PROPERTY

BACKGROUND OF THE INVENTION

1. Field of the Invention

The present invention relates to a recording medium incorporated within a recording medium drive such as a hard disk drive (HDD), for example. In particular, the invention relates to a recording medium including a recording layer and a protection layer overlaid on the surface of the recording layer.

2. Description of the Prior Art

A recording medium, namely a magnetic recording disk, is incorporated in a hard disk drive (HDD). The magnetic recording disk includes a protection layer overlaid over the surface of a magnetic recording layer. A lubricant film is formed over the surface of the protection layer. A diamond-like-carbon (DLC) film is often utilized as the protection layer, for example. A perfluoropolyether (PFPE) film is often utilized as the lubricant film, for example.

The DLC film is designed to have a constant composition all over the surface of the magnetic recording disk. The DLC film establishes a constant property all over the magnetic recording disk. A data zone and a non-data zone are both defined on the surface of the magnetic recording disk, for example. If the data zone and the non-data zone have different properties, various advantages are expected.

SUMMARY OF THE INVENTION

It is accordingly an object of the present invention to provide a recording medium including a protection layer having different properties over different areas.

According to the present invention, there is provided a recording medium comprising: a recording layer; a first protection layer overlaid on the surface of the recording layer; and a second protection layer overlaid on the surface of the recording layer at a position adjacent the first protection layer, said second protection layer having a composition different from that of the first protection layer.

The first and second protection layers have different compositions, so that the overall protection layer is allowed to have an unequal property. The second protection layer may have a hardness higher than that of the first protection layer. A higher hardness of the second protection layer serves to avoid damages on the surface of the recording medium. The recording medium can be protected from collision or contact of an object. In this case, the first protection layer may comprise a carbon film including nitrogen at a first content, while the second protection layer may comprise a carbon film including nitrogen at a second content smaller than the first content.

In particular, the second protection layer may cover the recording layer over an area outside a data zone holding data. The second protection layer serves to avoid damages on the surface of the recording medium particularly over the area outside the data zone. The recording medium can be protected from collision or contact of an object. The recording medium often tends to suffer from such collision and contact over the area outside the data zone rather than the data zone.

The second protection layer may have a thickness larger than that of the first protection layer. A larger thickness serves to improve the durability of the second protection layer. The second protection layer reliably contributes to protection of the recording medium from damages.

The recording medium may further comprise: a first lubricant film covering over the surface of the first protection layer; and a second lubricant film covering over the surface of the second protection layer at a position adjacent the first lubricant film. The second lubricant film includes an additive containing phosphorus. The additive serves to protect the second lubricant film from heat. The deterioration of the second lubricant film is thus prevented. The durability of the second lubricant film can accordingly be improved. The second lubricant film serves to reliably prevent damages on the second protection layer. The recording medium is reliably protected from collision or contact of an object.

The recording medium may further comprise: a first lubricant film covering over the surface of the first protection layer, said first lubricant film having a first thickness; and a second lubricant film covering over the surface of the second protection layer at a position adjacent the first lubricant film, said second lubricant film having a second thickness larger than the first thickness. A larger thickness serves to improve the durability of the second lubricant film. The second lubricant film reliably contributes to protection of the recording medium from damages.

The aforementioned recording medium may be incorporated within a recording medium drive or storage device. The recording medium drive may include a head slider; a head actuator supporting the head slider at the tip end, said head actuator designed to rotate around a support shaft so as to displace the head slider relative to the recording medium; and a ramp member extending along a path of the tip end of the head actuator from the tip end opposed to the second protection layer, said ramp member reaching the outside of the recording medium.

Alternatively, the recording medium drive may comprise a head slider supporting at least one of a write head element and a read head element. In this case, the head slider may be received on the surface of the second protection layer when the recording disk stands still.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
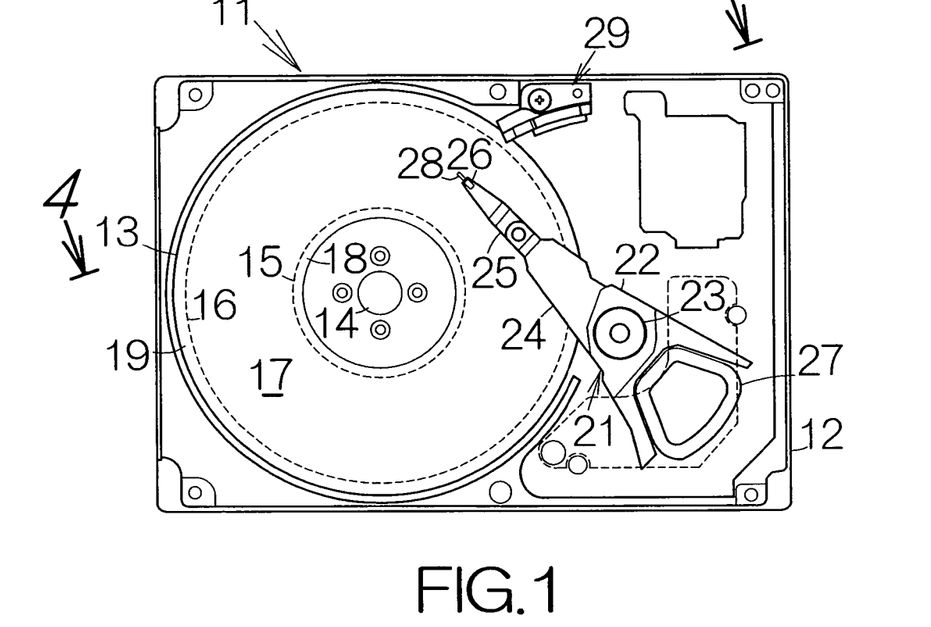
FIG. 1 is a plan view schematically illustrating the inner structure of a hard disk drive (HDD) as a specific example of a recording disk drive according to a first embodiment of the present invention.

FIG. 1 schematically illustrates the inner structure of a hard disk drive (HDD) 11 as an example of a recording disk drive or storage device according to a first embodiment of the present invention. The HDD 11 includes a box-shaped main enclosure 12 defining an inner space of a flat parallelepiped, for example. At least one magnetic recording disk 13 is mounted on the driving shaft of a spindle motor 14 within the main enclosure 12. The spindle motor 14 is allowed to drive the magnetic recording disk 13 for rotation at a higher revolution speed such as 5,400 rpm, 7,200 rpm, 10,000 rpm, or the like, for example. A cover, not shown, is coupled to the main enclosure 12 so as to define the closed inner space between the main enclosure 12 and the cover itself.

A data zone 17 is defined over the front and back surfaces of the individual magnetic recording disk 13 between an innermost recording track 15 and an outermost recording track 16. Concentric recording circles or tracks are defined within the data zone 17. The recording tracks are designed to hold information data. A non-data zone 18 is defined inside the innermost recording track 15. A non-data zone 19 is likewise defined outside the outermost recording track 16. No magnetic information is recorded on the non-data zones 18, 19. The non-data zones 18, 19 are located at positions adjacent the data zone 17.

A head actuator 21 is also incorporated in the inner space of the main enclosure 12. The head actuator 21 comprises an actuator block 22. The actuator block 22 is coupled to a vertical support shaft 23 for relative rotation. Rigid actuator arms 24 are defined in the actuator block 22 so as to extend in the horizontal direction from the vertical support shaft 23. The actuator block 22 may be made of aluminum. Molding process may be employed to form the actuator block 22.

Head suspensions 25 are fixed to the corresponding tip ends of the actuator arms 24 so as to further extend in the forward direction from the actuator arms 24. A gimbal spring, not shown, is connected to the tip end of the individual head suspension 25. A flying head slider 26 is fixed on the surface of the gimbal spring. The gimbal spring allows the flying head slider 26 to change its attitude relative to the head suspension 25.

An electromagnetic transducer, not shown, is mounted on the flying head slider 26. The electromagnetic transducer may include a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example.

The head suspension 25 serves to urge the flying head slider 26 toward the surface of the magnetic recording disk 13. When the magnetic recording disk 13 rotates, the flying head slider 26 is allowed to receive airflow generated along the rotating magnetic recording disk 13. The airflow serves to generate a positive pressure or lift on the flying head slider 26. The flying head slider 26 is thus allowed to keep flying above the surface of the magnetic recording disk 13 during the rotation of the magnetic recording disk 13 at a higher stability established by the balance between the urging force of the head suspension 19 and the lift.

When the head actuator 21 is driven to swing about the support shaft 23 during the flight of the flying head slider 26, the flying head slider 26 is allowed to move along the radial direction of the magnetic recording disk 13. The head actuator 21 in this manner serves to displace the flying head slider 26 relative to the magnetic recording disk 13. The radial movement allows the electromagnetic transducer on the flying head slider 26 to cross the data zone 17 between the innermost recording track 15 and the outermost recording track 16. The flying head slider 26 is thus positioned right above a target recording track on the magnetic recording disk 13. A power source 27 such as a voice coil motor (VCM) may be employed to realize the rotation of the head actuator 21, for example.

A load tab 28 is attached to the front or tip end of the head suspension 25 so as to further extend in the forward direction from the head suspension 25. The load tab 28 is allowed to move in the radial direction of the magnetic recording disk 13 based on the swinging movement of the head actuator 21. A ramp member 29 is located outside the magnetic recording disk 13 on the path of movement of the load tab 28. Specifically, the ramp member 29 is designed to extend along the path of the load tab 28 from the tip end opposed to the non-data zone 19 of the magnetic recording disk 13. The ramp member 29 is designed to reach a position outside the magnetic recording disk 13. The combination of the load tab 28 and the ramp member 29 establishes a so-called load/unload mechanism. The ramp member 29 may be made of a hard plastic material, for example.

Figure 2:
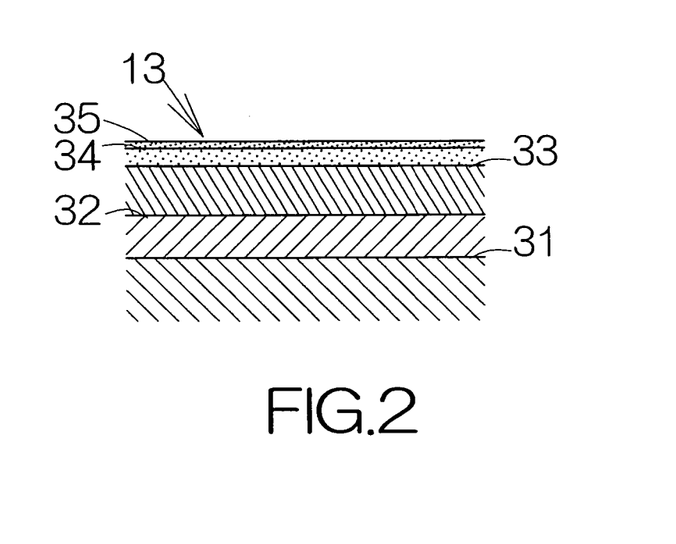
FIG. 2 is an enlarged sectional view illustrating the structure of a magnetic recording disk in detail.

FIG. 2 illustrates a cross-section of the magnetic recording disk 13. The magnetic recording disk 13 includes a substrate 31. The substrate 31 may be made of glass, for example. Alternatively, an aluminum substrate, a ceramic substrate, a silicon substrate, a sapphire substrate, or the like may be employed as the substrate 31.

An underlayer 32 is overlaid on the surface of the substrate 31. The underlayer 32 may be a Cr thin film having a thickness of 5.0 nm approximately, for example. A magnetic recording layer 33 is overlaid on the surface of the underlayer 32. The magnetic recording layer 33 is designed to hold magnetic information or bit data. The magnetic recording layer 33 may be a CoCrPt thin film having a thickness of 20.0 nm approximately, for example.

A protection layer 34 is overlaid on the surface of the magnetic recording layer 33. A carbon thin film is employed as the protection layer 34, for example. Here, the protection layer 34 may be a diamond-like-carbon (DLC) thin film having a thickness of 5.0 nm approximately, for example. The protection layer 34 is covered with a lubricant film 35. The lubricant film 35 may be a perfluoropolyether (PFPE) thin film having a thickness of 1.0 nm approximately, for example.

Figure 3:
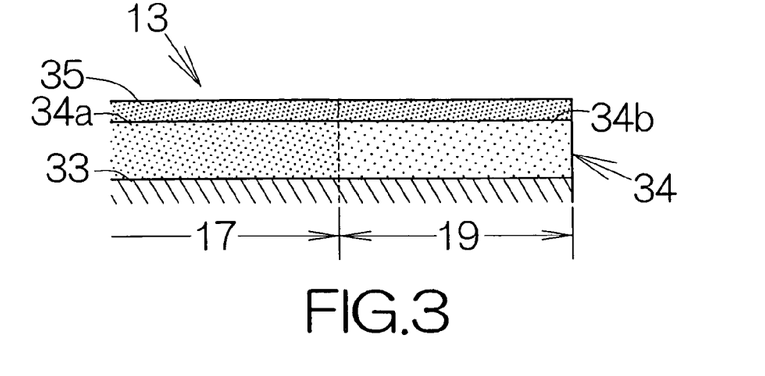
FIG. 3 is an enlarged partial sectional view schematically illustrating the structure of a protection layer.

As shown in FIG. 3, the protection layer 34 includes a first protection layer 34a covering over the data zone 17 and a second protection layer 34b covering over the non-data zone 19. The second protection layer 34b is in this manner designed to cover over the magnetic recording layer 33 over an area outside the data zone 17. The second protection layer 34b is located adjacent the first protection layer 34b along the surface of the magnetic recording layer 33.

The first protection layer 34a includes a nonmetallic element or elements such as nitrogen at a first content. The first content may be set equal to or larger than 4 atom %, for example. The addition of the nitrogen in this manner serves to improve the cohesion between the first protection layer 34a and the lubricant film 35. The second protection layer 34b includes a nonmetallic element or elements such as nitrogen at a second content smaller than the first content. The second content may be set smaller than 4 atom %, for example. The reduced content in this manner serves to establish a hardness higher than that of the first protection layer 34a. The first and second protection layers 34a, 34b have different compositions in this manner. The unequal property can be established in the protection layer 34.

Figure 4:
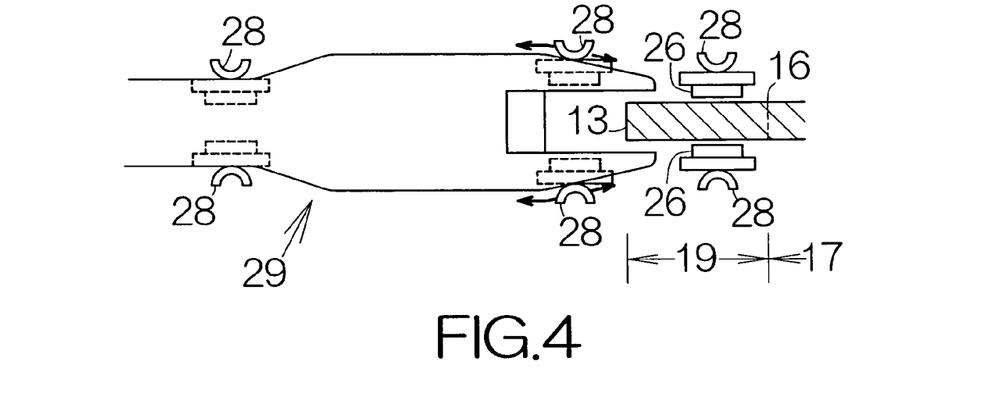
FIG. 4 is an enlarged partial sectional view taken along the line 4-4 in FIG. 1 for schematically illustrating the structure of a ramp member.

Now, assume that the magnetic recording disk 13 starts rotating. The head actuator 21 is held outside the outermost recording track 16 on the magnetic recording disk 13 when the magnetic recording disk 13 stands still. The load tab 28 is received on the ramp member 29. When the magnetic recording disk 13 starts rotating, the head actuator 21 is allowed to swing around the support shaft 23 toward the rotation axis of the magnetic recording disk 13. The swinging movement allows the load tab 28 to take off from the ramp member 29 above the non-data zone 19, as shown in FIG. 4, for example. Airflow acts on the flying head slider 26 from the rotating magnetic recording disk 13. The flying head slider 26 is thereafter allowed to fly above the surface of the magnetic recording disk 13 as described above. The electromagnetic transducer can be positioned above a target recording track within the data zone 17. The magnetic bit data can be written or read out.

When the magnetic bit data has been written or read out, the head actuator 21 is allowed to swing around the support shaft 23 to bring the tip end outside the magnetic recording disk 13. The swinging movement causes the load tab 28 to contact the ramp member 29 above the non-data zone 19, as shown in FIG. 4, for example. A further swinging movement allows the load tab 28 to climb up the ramp member 29. When the load tab 28 reaches the position remotest from the magnetic recording disk 13, the flying head slider 26 is positioned at a standby position. The load tab 28 is in this manner received on the ramp member 29. The magnetic recording disk 13 then stops rotating. Since the load tab 28 is held on the ramp member 29, the flying head slider 26 can be prevented from contacting the magnetic recording disk 13 irrespective of no airflow acting on the flying head slider 26.

When the load tab 28 is forced to climb up the ramp member 29, the flying head slider 26 is roundly pulled away from the surface of the magnetic recording disk 13. The lift or positive pressure is lost faster than the vanishment of the negative pressure at the flying head slider 26. In this case, the flying head slider 26 may sometimes suffer from collision against the surface of the magnetic recording disk 13 at the non-data zone 19. The non-data zone 19 is covered with the second protection layer 34b. The second protection layer 34b has a hardness higher than that of the first protection layer 34a. The second protection layer 34b serves to avoid damages on the magnetic recording disk 13 rather than the first protection layer 34a. The magnetic recording disk 13 is thus protected from collision of the flying head slider 26.

In addition, the cohesion is improved between the first protection layer 34a and the lubricant film 35 based on the addition of nitrogen. A flattened surface is reliably established over the surface of the lubricant film 34 on the first protection layer 34a. The flying head slider 26 reliably gets closer to the surface of the magnetic recording disk 13 over the data zone 17.

Next, a brief description will be made on a method of making the magnetic recording disk 13. A disk-shaped substrate 31 is first prepared. The surface of the substrate 31 has been flattened. A sputtering method may be employed to form the underlayer 32 and the magnetic recording layer 33 in a conventional manner. In this case, sputtering is effected on the substrate 31 in a chamber. The underlayer 32 and the magnetic recording layer 33 are sequentially overlaid on the surface of the substrate 31 in the chamber. The substrate 31 is thereafter taken out of the chamber.

The protection layer 34 is then formed on the surface of the magnetic recording layer 33. A sputtering method may be employed to form the protection layer 34 in a conventional manner. Here, sputtering is effected in first and second chambers. Nitrogen gas is introduced into the first chamber thicker than the second chamber. Carbon targets are set in the first and second chambers, respectively. The substrate 31 is first set within the first chamber.

Figure 5:
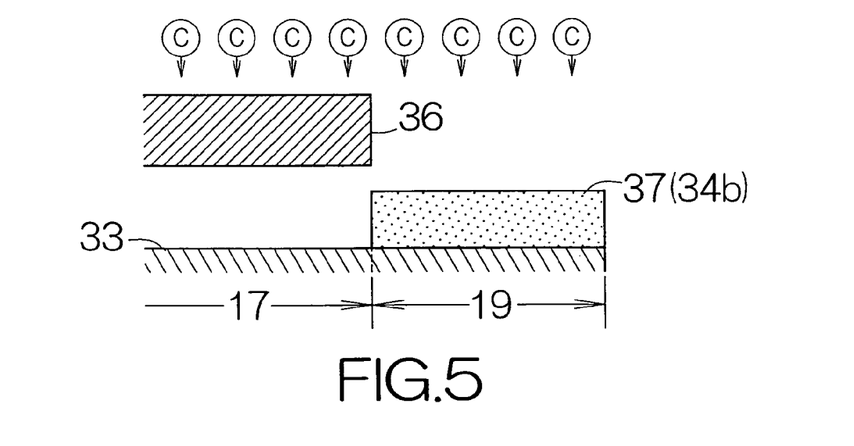
FIG. 5 is a sectional view of a substrate for the magnetic recording disk when a second protection layer is formed.

As shown in FIG. 5, a disk-shaped shielding member 36 is located in a space between the carbon target, not shown, and the substrate 31. The shielding member 36 is designed to cover over the data zone 17 of the magnetic recording disk 13. When carbon atoms are discharged out of the carbon target, the carbon atoms are allowed to fall over the surface of the magnetic recording layer 33. The shielding member 36 serves to prevent the carbon atoms from reaching the magnetic recording layer 33 within the data zone 17. A carbon thin film 37 is formed over the surface of the magnetic recording layer 33 within the non-data zone 19. The carbon thin film 37 is allowed to include nitrogen at a content smaller than 4 atom % based on adjustment of the thickness of the nitrogen gas within the first chamber, for example. The second protection film 34b is in this manner established over the non-data zone 19. The substrate 31 is thereafter taken out of the first chamber.

Figure 6:
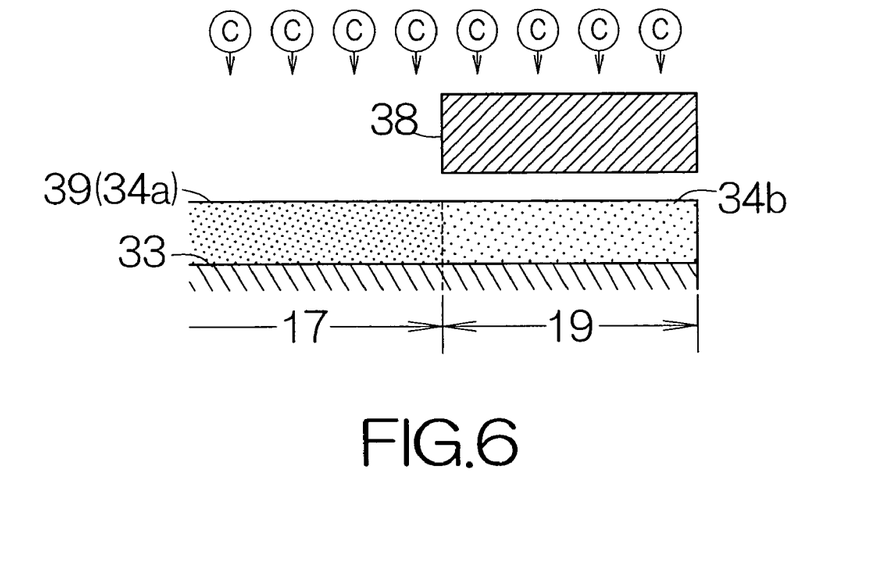
FIG. 6 is a sectional view of the substrate when a first protection layer is formed.

The substrate 31 is then set in the second chamber. As shown in FIG. 6, an annular shielding member 38 is located in a space between the carbon target, not shown, and the substrate 31. The shielding member 38 is designed to cover over the non-data zone 19 of the magnetic recording disk 13. When carbon atoms are discharged out of the carbon target, the carbon atoms are allowed to fall over the surface of the magnetic recording layer 33. In this case, the shielding member 38 serves to prevent the carbon atoms from reaching the second protection layer 34b over the non-data zone 19. A carbon thin film 39 is formed over the surface of the magnetic recording layer 33 within the data zone 17. The carbon thin film 39 is allowed to include nitrogen at a content equal to or larger than 4 atom % based on adjustment of the thickness of the nitrogen gas within the second chamber, for example. The first protection film 34a is in this manner established over the data zone 17. Here, the first and second protection layers 34a, 34b may have the identical thickness on the magnetic recording layer 33.

The substrate 31 is then taken out of the second chamber. The lubricant film 35 is applied to the surface of the protection layer 34. A dipping method may be employed to apply the lubricant in a conventional manner. In this case, the substrate 31 may be dipped into a solution including perfluoropolyether, for example. The surface of the protection layer 34 is in this manner covered with the lubricant film 35.

The inventors have examined the endurance of a protection layer in connection with the content of nitrogen. The inventors have prepared first to fourth examples of a magnetic recording disk. The magnetic recording disk includes a protection layer and a lubricant film extending all over its surface in the first to fourth examples. The protection layer contains nitrogen at the content of 16 atom % in the first example. The protection layer contains nitrogen at the content of 8 atom % in the second example. The protection layer contains nitrogen at the content of 4 atom % in the third example. No nitrogen was added to the protection layer in the fourth example. The thickness of the lubricant film was set at 4.0 nm in the first to fourth examples.

Figure 7:
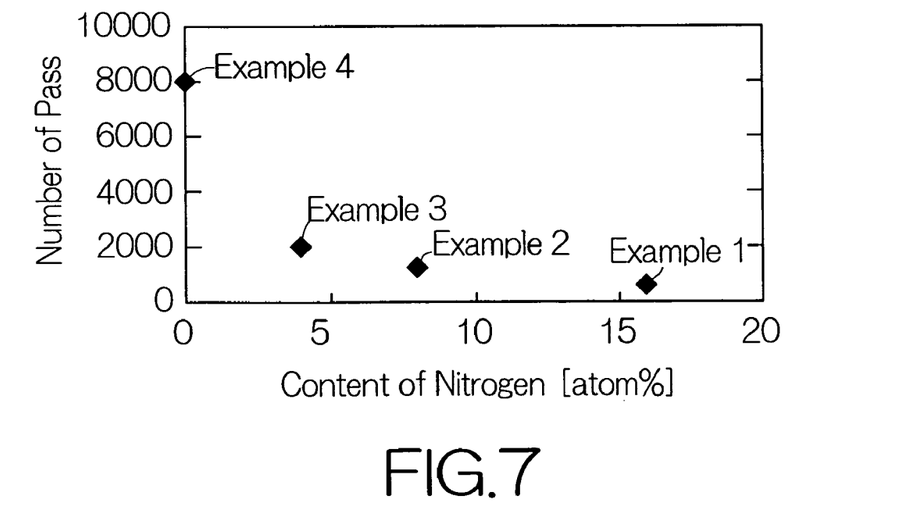
FIG. 7 is a graph illustrating the result of a specific examination.

A hard metallic ball is urged against the surface of the rotating magnetic recording disk at an intermediate position between the innermost and outermost recording tracks. The diameter of the ball was set at 2.0 mm. The weight of the ball was set at 10 g. The linear or tangential velocity of the magnetic recording disk was set at 0.25 m/sec at the intermediate position. The number of rotation or pass was counted until scratches are formed on the surface of the magnetic recording disk.

As shown in FIG. 7, it has been proved that a reduced content of nitrogen in the protection layer leads to an increased number of the pass. In particular, the magnetic recording disk of the fourth example without addition of nitrogen enjoys a superior hardness as compared with the magnetic recording disks of the first to third examples. It has been proved that the second protection layer 34b including nitrogen at a content smaller than 4 atom % serves to sufficiently protect the magnetic recording layer 33 in the magnetic recording disk 13. Addition of nitrogen in the second protection layer 34b may thus be omitted from the aforementioned magnetic recording disk 13.

Figure 8:
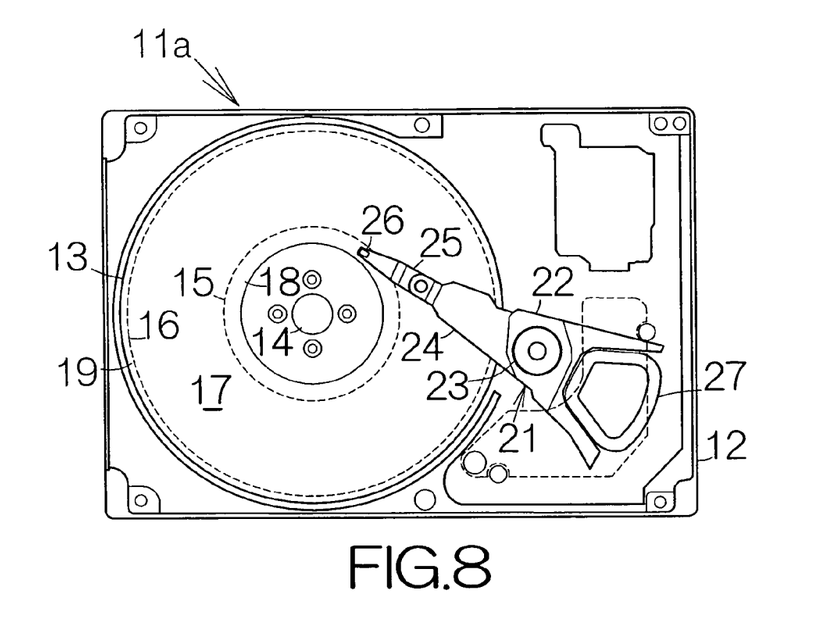
FIG. 8 is a plan view schematically illustrating the inner structure of a hard disk drive (HDD) as a specific example of a recording disk drive according to a second embodiment of the present invention.

FIG. 8 schematically illustrates the inner structure of a hard disk drive 11a according to a second embodiment of the present invention. A so-called contact start stop (CSS) mechanism is employed in this HDD 11a. The load tab 28 is omitted in the head actuator 21. The ramp member 29 is also omitted in the HDD 11a. Like reference numerals are attached to structures or components equivalent to those of the aforementioned first embodiment.

Figure 9:
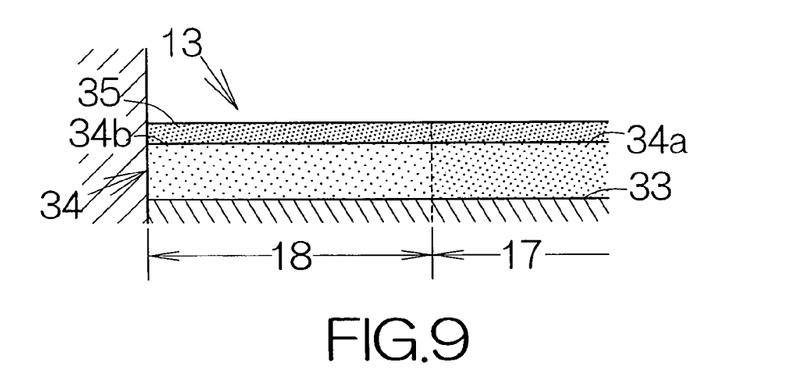
FIG. 9 is an enlarged partial sectional view schematically illustrating the structure of a protection layer.

As shown in FIG. 9, the magnetic recording disk 13 includes the second protection layer 34b covering over the non-data zone 18 in the HDD 11a. The second protection layer 34b is located adjacent the first protection layer 34a on the magnetic recording layer 33. The second protection layer 34b has a composition different from that of the first protection layer 34a in the aforementioned manner. The second protection layer 34b includes a nonmetallic element or elements such as nitrogen at a content [atom %] smaller than that of the first protection layer 34a. Here, the first protection layer 34a may include nitrogen at a content equal to or larger than 4 atom %, for example. The second protection layer 34b may include nitrogen at a content smaller than 4 atom %, for example.

Now, assume that the magnetic recording disk 13 starts rotating. The flying head slider 26 is held inside the innermost recording track 15 on the magnetic recording disk 13 when the magnetic recording disk 13 stands still. The flying head slider 26 is received on the surface of the magnetic recording disk 13 at the non-data zone 18. When the magnetic recording disk 13 starts rotating, the flying head slider 26 slides along the surface of the magnetic recording disk 13. The flying head slider 26 then receives airflow generated along the rotating magnetic recording disk 13. The flying head slider 26 is thus allowed to take off from the surface of the magnetic recording disk 13. The head actuator 21 is driven to swing around the support shaft 23 toward the outer periphery of the magnetic recording disk 13 during the flight of the flying head slider 26. The electromagnetic transducer is thus positioned above a target recording track within the data zone 17 on the magnetic recording disk 13. The magnetic bit data can be written or read out.

When the magnetic bit data has been written or read out, the head actuator is driven to swing around the support shaft 23 toward the rotation axis of the magnetic recording disk 13. The swinging movement serves to position the flying head slider 23 above the non-data zone 18 inside the innermost recording track 15. When the rotation speed of the magnetic recording disk 13 gets reduced, the flying head slider 26 receives less airflow. The flying head slider 26 is thus allowed to contact the surface of the magnetic recording disk 13. The flying head slider 26 starts sliding over the surface of the magnetic recording disk 13. The magnetic recording disk 13 then stops rotating. The flying head slider 26 is in this manner received on the surface of the magnetic recording disk 13 at the non-data zone 18.

The HDD 11a allows the flying head slider 26 to slide on the magnetic recording disk 13 at the non-data zone 18 when the magnetic recording disk 13 starts or stops rotating. The flying head slider 26 likewise keeps contacting the magnetic recording disk 13 at the non-data zone 18 when the magnetic recording disk 13 stands still. In this case, the non-data zone 18 is covered with the second protection layer 34b having a hardness higher than the first protection layer 34a. The second protection layer 34b serves to avoid damages on the magnetic recording disk 13. The magnetic recording disk 13 is protected from the collision or contact of the flying head slider 26.

Figure 10:
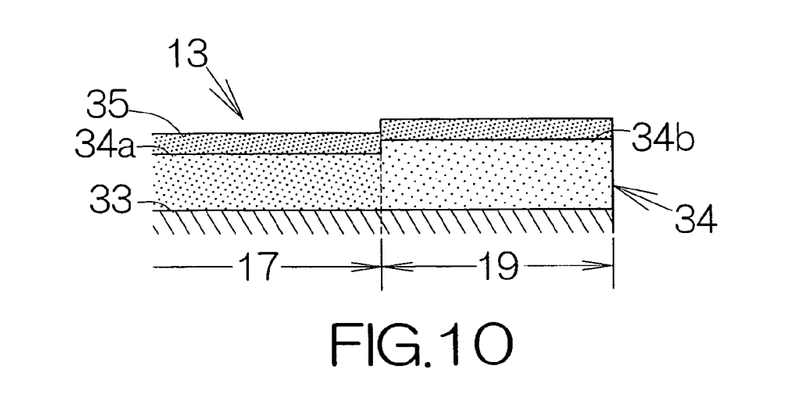
FIG. 10 is an enlarged partial sectional view schematically illustrating the structure of a protection layer and a lubricant film.

As shown in FIG. 10, the thickness of the second protection layer 34b may be set larger than that of the first protection layer 34a in the HDDs 11, 11a, for example. The difference of the thickness may be set smaller than the flying height of the flying head slider 26. A larger thickness contributes to a further improved durability of the second protection layer 34b. Moreover, a smaller thickness of the first protection layer 34a contributes to a reduced flying height of the flying head slider 26 over the data zone 17. The electromagnetic transducer on the flying head slider 26 can get closer to the magnetic recording layer 33 on the magnetic recording disk 13.

Figure 11:
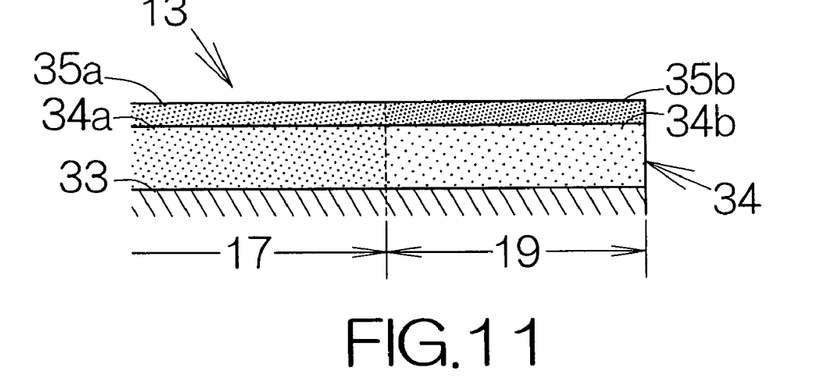
FIG. 11 is an enlarged partial sectional view schematically illustrating the structure of a protection layer and a lubricant film.

As shown in FIG. 11, the lubricant film 35 may include a first lubricant film 35a covering over the first protection layer 34a and a second lubricant film 35b covering over the second protection layer 34b, for example. The second lubricant film 35b is located adjacent the first lubricant film 35a on the protection layer 34. An additive containing phosphorus is added to the perfluoropolyether in the second lubricant film 35b. The second lubricant film 35b may include the additive at a content ranging 5 wt % and 10 wt % in the overall weight of the second lubricant film 35b, for example. A fluorine compound containing phosphorus may be employed as the additive, for example. The fluorine compound may have a phosphagen nucleus or nuclei.

The collision between the flying head slider 26 and the magnetic recording disk 13 causes heat on the magnetic recording disk 13. The heat is supposed to deteriorate the lubricant film 35. The deterioration of the lubricant film 35 leads to less protection of the protection layer 34. The additive serves to protect the second lubricant film 35b from heat. The deterioration of the second lubricant film 35b is thus prevented. The durability of the second lubricant film 35b can be improved. The second lubricant film 35b serves to reliably prevent damages on the second protection layer 34b. The magnetic recording disk 13 is reliably protected from collision or contact of the flying head slider 26.

A dipping method may be employed to form the first and second lubricant films 35a, 35b in a conventional manner. A disk-shaped mask is overlaid on the first protection layer 34a. A packing is interposed between the mask and the first protection layer 34a. The substrate 31 is then dipped into a solution including perfluoropolyether. The solution further contains the additive at a predetermined content as described above. The second lubricant film 35b can be obtained in this manner. The mask is then removed. The surface of the second lubricant film 35b is this time covered with an annular mask. A packing may be interposed between the mask and the second lubricant film 35b. The substrate 31 is thereafter dipped into a solution including perfluoropolyether. The first lubricant film 35a is thus obtained.

Figure 12:
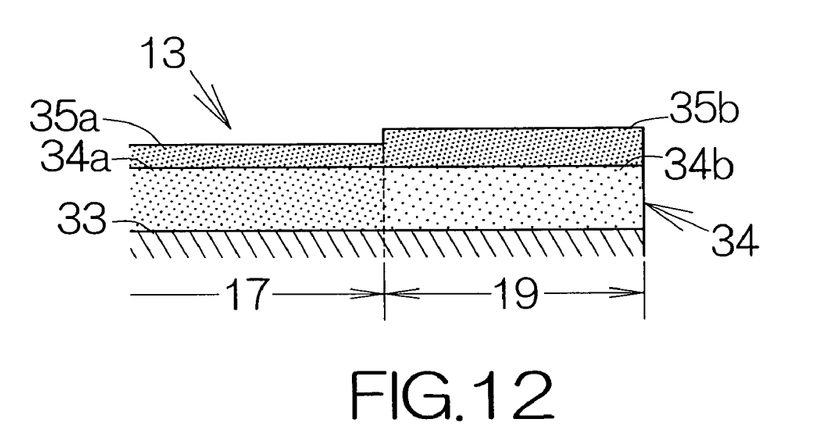
FIG. 12 is an enlarged partial sectional view schematically illustrating the structure of a lubricant film.

As shown in FIG. 12, the thickness of the second lubricant film 35b may be set larger than that of the first lubricant film 35a, for example. The difference of the thickness may be set smaller than the flying height of the flying head slider 26. A larger thickness contributes to a further improved durability of the second lubricant film 35b. Moreover, a smaller thickness of the first lubricant film 35a contributes to a reduced flying height of the flying head slider 26 over the data zone 17. The electromagnetic transducer on the flying head slider 26 can get closer to the magnetic recording layer 33 on the magnetic recording disk 13.

What is claimed is:

1. A recording medium comprising:
   a recording layer;
   a first protection layer formed directly on a surface of the recording layer, said first protection layer comprising a carbon film including nitrogen at a first content; and
   a second protection layer formed directly on the surface of the recording layer adjacent the first protection layer, said second protection layer covering the recording layer over an area outside a data zone, that holds data, said second protection layer comprising a carbon film including nitrogen at a second content smaller than the first content, said second protection layer having a composition different from that of the first protection layer, the second protection layer having a hardness higher than that of the first protection layer.

2. The recording medium according to claim 1, wherein said second protection layer has a thickness larger than that of the first protection layer.

3. A recording medium comprising:
   a recording layer;
   a first protection layer formed on a surface of the recording layer;
   a second protection layer formed on the surface of the recording layer adjacent the first protection layer, said second protection layer having a composition different from that of the first protection layer, said second protection layer having a hardness higher than that of the first protection layer;
   a first lubricant film covering over a surface of the first protection layer; and
   a second lubricant film covering over a surface of the second protection layer at a position adjacent the first lubricant film, said second lubricant film including an additive containing phosphorus.

4. The recording medium according to claim 1, further comprising:
   a first lubricant film covering over a surface of the first protection layer, said first lubricant film having a first thickness; and
   a second lubricant film covering over a surface of the second protection layer at a position adjacent the first lubricant film, said second lubricant film having a second thickness larger than the first thickness.

5. A recording medium drive comprising:
   a substrate for a recording medium;
   a recording layer formed on the substrate;
   a first protection layer formed directly on a surface of the recording layer, said first protection layer comprising a carbon film including nitrogen at a first content; and
   a second protection layer formed directly on the surface of the recording layer adjacent the first protection layer, said second protection layer covering the recording layer over an area outside a data zone, that holds data, said second protection layer comprising a carbon film including nitrogen at a second content smaller than the first content, said second protection layer having a composition different from that of the first protection layer, the second protection layer having a hardness higher than that of the first protection layer.

6. The recording medium according to claim 1, wherein a first area is assigned on a surface of the recording layer, a second area is assigned on the surface of the recording layer off the first area, the first protection layer is formed in the first area, and the second protection layer is formed in the second area.

7. The recording medium according to claim 6, wherein the first area corresponds to a data zone of the recording medium and the second area corresponds to a non-data zone of the recording medium.

8. The recording medium drive according to claim 5, wherein a first area is assigned on a surface of the recording layer, a second area is assigned on the surface of the recording layer off the first area, the first protection layer is formed in the first area, and the second protection layer is formed in the second area.

9. The recording medium drive according to claim 8, wherein the first area corresponds to a data zone of the recording medium and the second area corresponds to a non-data zone of the recording medium.

* * * * *